March 12, 1957 — F. E. MARTINEZ — 2,784,733
CHECK VALVE FOR PARENTERAL SOLUTIONS
Filed Oct. 8, 1954
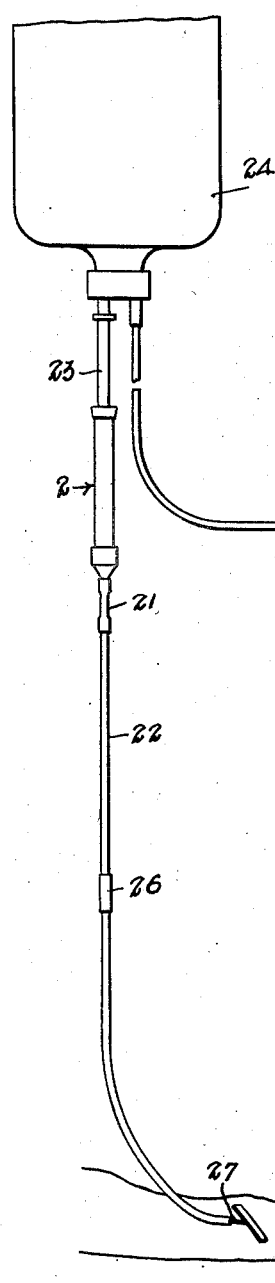
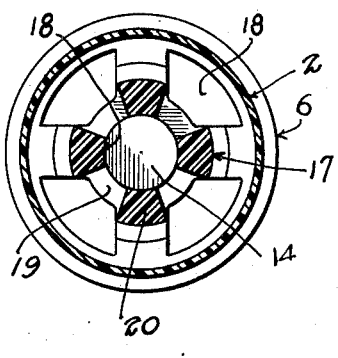
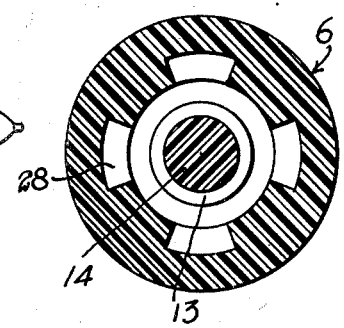
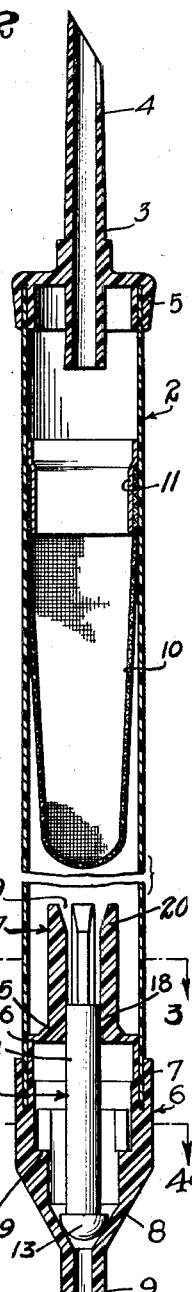
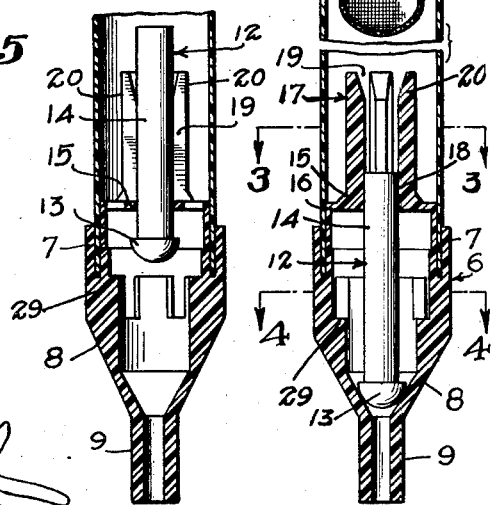
INVENTOR.
FRANK E. MARTINEZ
BY
ATTORNEYS

United States Patent Office

2,784,733
Patented Mar. 12, 1957

2,784,733

CHECK VALVE FOR PARENTERAL SOLUTIONS

Frank E. Martinez, San Gabriel, Calif., assignor to Don Baxter, Inc., Glendale, Calif., a corporation of Nevada Application October 8, 1954, Serial No. 461,100

4 Claims. (Cl. 137—399)

This invention relates to a device intended to be used in the administration of parenteral solutions. This device includes a safety valve designed to stop the administration of the parenteral solution when the solution is nearly exhausted. The device of the present invention is also designed to allow the changing of solution containers to a single administration set.

In certain cases it is desired to administer blood, plasma, or other fluid to a patient very rapidly by pressure. In such cases extreme care is necessary to prevent the injection of air or other gas into the patient when the solution becomes exhausted. In surgical cases it is sometimes desirable to maintain the patient in a hypotensive state so as to reduce bleeding, and in such cases which receive the parenteral solutions, the venous pressure may not be high enough to prevent air from entering the vein after the solution is exhausted.

A general object of the present invention is to provide a unit of an administration set which includes a float-type check valve. This is adapted to stop the flow when the solution in the container is exhausted. More specifically, it is an object of the present invention to stop the fluid while there is still retained in the unit a substantial volume of fluid which will be effective to prevent danger of any air or other gases being passed by the unit to the patient.

A further object of the invention is to so design a float valve that it will not shut off the flow of fluid prematurely and which float valve is inexpensive and expendable and which will not contaminate or adversely affect the fluids it contacts.

Another object of the present invention is to provide a float valve containing unit so designed that the float valve can be readily released from the closed position after filling the unit, and which unit facilitates replenishing the fluid supplied by the use of additional containers because of the fact that the float valve may be so readily released.

The present invention will be more fully understood from the following description of a preferred example of the invention, the description being given in connection with the accompanying drawings, in which, Figure 1 is diagrammatic elevation of a blood transfusion set including the present invention;

Figure 2 is an elevation, mainly in vertical section, of the check valve pressure set of Figure 1 without a flexible section of tubing between the set and container;

Figure 3 is a section on the line 3—3 of Figure 2;

Figure 4 is a section on the line 4—4 of Figure 2; and

Figure 5 is a fragmentary vertical section of the check valve unit seat with the floating valve member in the open position.

Referring first to Figure 2 of the drawing, Figure 2 illustrates the invention embodied in a check valve pressure set which comprises a housing 2, preferably made of transparent material, and tubular shaped. This housing 2 is also preferably semiflexible, that is to say, it may be collapsed or partially collapsed by squeezing and when released will return to substantially its original position. Alternately, however, a rigid transparent housing may be used, in which case, as hereafter described, it may be necessary to fill the unit by tipping the same. At the upper end of the housing 2 is provided a spike 3 which may be of rigid plastic material which has a puncture point 4 adapted to be inserted in the outlet hole of a parenteral solution container. Below the spike 3 in the integral cap there is a double wall section 5 into which the upper end of the housing extends and makes a sealing fit.

At the lower end of the housing 2 is provided a bottom cap 6 which likewise may be provided with a double flange 7 in which the lower end of the housing 2 makes a sealing fit. The medial portion of the bottom cap 6 tapers as indicated at 8 toward the outlet tubular section 9, thus providing a valve seat. The inner wall of the bottom cap 6 is provided with the notches 28 (Figure 4) which are adapted to increase the area through which the fluid flows and thereby reduce the fluid velocity.

At the bottom of said notches there are shoulders 29 which are adapted to impart a horizontal flow of the liquid at this point. These features prevent the formation of a vortex of fast flowing fluid which might otherwise tend to seat the floating valve member 12 prematurely.

Within the housing 2 is provided a filter 10, such, for example, as a nylon sack, closed at its lower end and with its upper end attached to the housing 2 by a band or collar 11. While in the example illustrated a filter is included since the set is intended to act as a blood set, the filter is optional and not necessary where the invention is embodied as a solution set.

There is also provided a floating valve member 12 which is indicated as enlarged somewhat at its lower end and provided with a semispherical lower face 13 which is adapted to contact the tapering wall of the bottom cap 6 to close the outlet 9 thereof. This valve member is also provided with an elongated stem 14, which is indicated as having a length equal to a number of times the diameter of the valve face 13, which stem will allow the valve to seat while there still remains a substantial quantity of fluid within the chamber of the housing 2. By this means the valve member 12 seats and closes the outlet 9 while there remains fluid on both sides of the seat, thereby insuring against the passage of air or gas by the seat.

The floating member 12 may be of any material which has a specific gravity less than the fluids to be administered and is resistant to them and to the sterilization methods employed. Molded polyethylene and expanded foam Hycar have been proven particularly satisfactory materials from which to produce the floating valve member 12.

The unit of Figure 2 also includes a guide member 15 which is designed to maintain the floating valve member 12 in alignment so that its face 13 is over the outlet 9 of the bottom cap and in position to seat, the stem 14 of the floating valve member being maintained vertically by the guide member 15. This guide member 15 includes a flange ring portion 16 by which it is held in place in the housing 2 by being cemented, or heat sealed, or friction fitted into the housing 2. The guide member 15 also includes a spider 17 which has a central opening 18 having a loose fit with the stem 14 of the floating valve member 12. Passages 19 for flow of fluid are provided in the guide member between the legs of the spider from which extend a number of columns 20 which assist in maintaining the floating valve member 12 in vertical alignment with the valve seat without requiring any tight running fit between that member and the guide member 15.

As shown in Figure 1, in use there is a section of resilient and compressible tubing 21 attached to the lower end of the cap. Such section of tubing, made of rubber or thin-walled plastic, may extend from the cap 2 to a hypodermic needle 27, but it is more economical to connect the same as indicated to a plastic tubing 22 leading to the hypodermic needle.

In the use of the present invention the puncture point 4 is inserted in the outlet hole of the parenteral solution container 24. This container 24 is suspended in an inverted position and pressure may be applied by a bulb 25 to an air inlet of the container. When the housing 2 is made semiflexible the housing is then partially filled by squeezing it to expel air and releasing it to draw fluid from the container 24 into the housing 2. Where the alternate practice of using a rigid housing is employed, then a section of flexible tubing 23 should be provided between the upper end of the housing and the spike 3 in order that the housing could be tipped independently of the container in order to unseat the valve member 12 and fill the housing by gravity. A clamp 26 on the tubing 22 is then opened and the set partially filled with fluid. Venipuncture is then made and administration started by again opening the clamp 26. If pressure is desired it is applied to the inlet of the container through the bulb 25 or other air supply means.

When the solution within the container 24 is exhausted the level of fluid in the housing 2 drops, causing the floating valve member 12 to drop until its face 13 is against the valve seat 8 (as shown in Figure 2), which operation occurs while there is still substantial liquid in the housing 2. This provides an insurance against any gas being allowed to enter the tubing 21. The resulting seal is formed below a substantial fluid level and is much more reliable than a seal formed with gas on either or both sides of the seal, such as generally occurs where merely a ball-type floating valve is utilized.

The spike 3 then may be removed from the container 24 and inserted in the stopper of another container to be connected to the administration set. After this is done the housing 2 again may be filled. Squeezing the tubing 21 after the housing 2 is sufficiently filled, allows the floating valve member 12 to leave its seat, whereupon administration can be continued. Since the floating valve member is so designed that there is always maintained a substantial fluid level within the housing 2, there is no danger of gas entering the tubing 21 or 22 during the connection of the set to a new container. If at any time during the administration the floating valve member 12 should become seated and thus shut off the flow of solution, either because of too rapid flow of solution drawing the float down into a closed position, or for some other reason, it may be quickly released by squeezing the tubing 21.

While the particular example of the invention herein described is well adapted to carry out the objects of the invention, this invention is of the scope set forth in the appended claims.

I claim:

1. A check valve unit for a parenteral solution which comprises, a circular transparent housing, an inlet at the upper end of said housing, a cap at the lower end of said housing providing an outlet, the base of the cap being tapered at the outlet to provide a valve seat, a floatable valve member movable into contact with the valve seat for closing of the outlet and including an extending stem by which the valve member is adapted to seat while there is still a substantial volume of fluid within said unit and above said valve seat, and guide means for said floatable valve member within said housing and contacting the same to maintain the floatable valve member in vertical alignment with said valve seat, a stop on said guide means for limiting the upward displacement of the floatable valve member, there being passages for fluid by said guide member, and a filter suspended within said housing the upper end of said filter being attached to the wall of the housing substantially below the inlet and the lower end of said filter being located above the top of the valve member stem when said stem is in its uppermost position.

2. A check valve unit for a parenteral solution which comprises, means forming a transparent fluid chamber having an inlet at its upper end and an outlet at its lower end, a drip indicator at said inlet and a valve seat at said outlet, and a floatable valve member movable into contact with said valve seat for closing said outlet, said floatable valve member including a vertically extending stem whereby it is adapted to seat while there still remains a substantial fluid content above said seat, means for guiding and maintaining the floatable valve member in alignment with said seat, means associated with said guiding means for limiting the upward displacement of said floatable valve member, and a filter suspended from the inner wall of said chamber substantially below the drip indicator, the bottom of said filter being located above the stem of the floatable valve member at said stem's uppermost position.

3. A check valve unit which comprises: a cylindrical, flexible, transparent housing; a cap at the upper end of said housing; a spike extending from said cap and having an inlet opening, said spike extending into the upper end of the housing to provide a drip indicator; a filter attached to the inner wall of said housing and suspended therein below said drip indicator; a cap at the lower end of said housing providing an outlet; a valve seat formed in the outlet by tapering of the inside wall of said lower cap; a floatable valve member movable into contact with the valve seat for closing the outlet; a vertically extending stem on said valve member; notches in said lower cap adapted to increase the area of fluid flow and having horizontal shoulders located above the valve seat; a guide member for said floatable valve member located in the housing and attached thereto, said guide member having a spider to allow passage of fluid therethrough; relatively long vertical legs attached to said spider and arranged to maintain alignment of the valve member with the valve seat from a position above said notches to a position where said valve is closed; means associated with said guide member for contacting the head of the floatable valve member to limit its upward displacement; a short, resilient rubber tube attached to said lower cap outlet below the valve seat; a transparent plastic tube connected to said rubber tube; and a clamping means for shutting off flow through said plastic tube.

4. A check valve unit which comprises: a flexible, transparent housing; a closure means at the upper end of said housing; a tubular inlet extending from said closure means, said tubular inlet extending into the upper end of the housing to provide a drip indicator; a closure means at the lower end of said housing providing an outlet; a valve seat in said outlet; a floatable valve member movable into contact with the valve seat for closing the outlet; a stem on said valve member; a guide member for the floatable valve member located in the housing and attached thereto, said guide member having a spider to allow passage of fluid therethrough; a central passageway through said spider adapted to fit around the valve member stem and to limit the uppermost position of the valve member; relatively long vertical legs attached to said spider and arranged to maintain alignment of the valve member with the valve seat from a position above the lower closure means to a position where said valve is closed; and a compressible member attached to said lower cap outlet below the valve seat.

References Cited in the file of this patent

UNITED STATES PATENTS

| | | |
|---|---|---|
| 2,642,867 | Livingston | June 23, 1953 |
| 2,693,801 | Foreman | Nov. 9, 1954 |
| 2,704,544 | Ryan | Mar. 2, 1955 |